Patented Sept. 4, 1928.

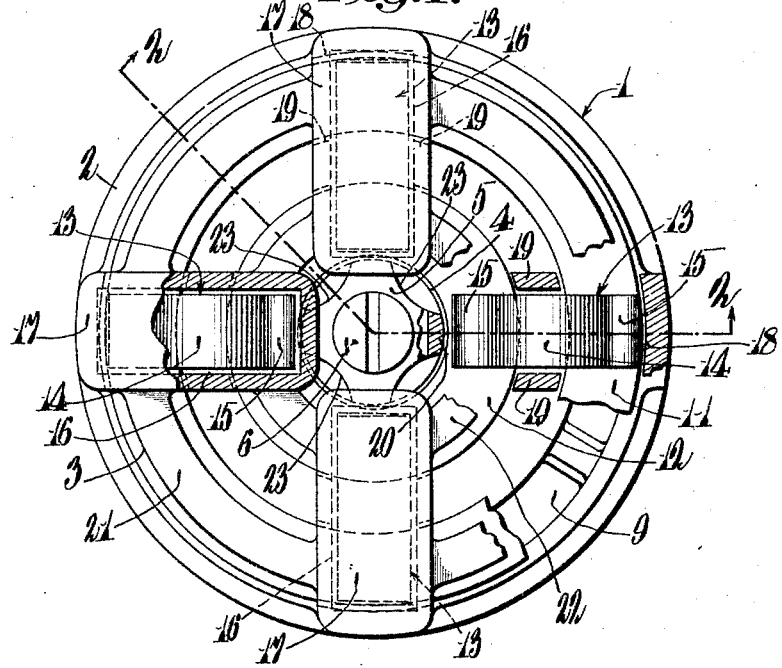

1,682,908

UNITED STATES PATENT OFFICE.

CHARLES F. OSGOOD, OF CLAREMONT, NEW HAMPSHIRE, ASSIGNOR TO SULLIVAN MACHINERY COMPANY, A CORPORATION OF MASSACHUSETTS.

VALVE MECHANISM.

Application filed December 19, 1923. Serial No. 681,597.

My invention relates to valve mechanisms. An object of my invention is to provide an improved valve mechanism. Another object of my invention is to provide an improved valve mechanism especially adapted to use with pumps, compressors or the like. Still another object of my invention is to provide an improved valve mechanism of compact, rugged, and simple character having an improved arrangement of the valve springs and other component parts. These and other objects and advantages will hereinafter more fully appear.

In the accompanying drawings I have shown for purposes of illustration one form which my invention may assume in practice.

In these drawings,—

Fig. 1 is a plan view of my improved valve mechanism, parts being broken away to facilitate illustration.

Fig. 2 is a transverse sectional view taken substantially on line 2—2 of Fig. 1.

Fig. 3 is a detail perspective view of my improved valve spring shown in position on the valves.

In the illustrative form of my invention I have shown a valve mechanism of improved form, generally designated 1, comprising a seat member 2 and a guard member 3. Herein, the seat member 2 is provided with a central recess 4 in which an annular depending portion 5 on the guard member registers, the seat and guard being rigidly held in assembled relation by means of a bolt 6 and a lock nut 7 disposed within a recess 8 in the bottom of the seat. As illustrated, the seat 2 is provided with a plurality of annular, concentrically disposed, ribbed flow openings 9 and 10 which are closed by annular plate valves 11 and 12 movable relative to the guard 3. These valves are normally held seated by means of a plurality of radially disposed leaf springs 13 having bowed central portions 14 and flattened or slightly curved end portions 15. Herein, these springs are disposed in chambers 16 formed in rectangular shaped members 17 formed integral with the guard 3. It will be observed that the guard is provided with depending valve guiding portions 18 and 19 adapted to guide the valve 11 and curved guiding portions 20 formed on the depending portion 5 adapted to guide the valve 12. The guides 19 likewise prevent lateral displacement of the valve springs 13. Herein, spaced annular ribs or backing members 21 and 22 formed integral with the guard member back up the valves 11, 12 in their raised position. The depending portion 5 of the guard is cut away or milled as at 23, to permit a free flow of the compressed fluid.

As a result of my improvement it will be noted that a valve mechanism of exceedingly simple, compact, and rugged character is produced having improved valve springs, large flow ports, and arrangement of other component parts which may be manufactured with facility and at a minimum expense. It will further be noted that single valve springs arranged at different radial points are used for seating both valves and that the guides for the valves also serve as guides for preventing lateral displacement of the valve springs.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a valve mechanism, a member providing concentric ported valve seats, annular valve members disposed on said seats, a guard member secured to said valve seat member, and a plurality of radially extending springs loosely guided by said guard member and slidably engaging said valve members, each of said springs lying wholly at one side of the center.

2. In a valve mechanism, a member providing concentric ported valve seats, annular valve members disposed on said seats, a guard member secured to said valve seat member and having spring receiving chambers formed therein, the side walls of said chambers having portions forming guides and spacers for said valve members, and radially extending springs loosely guided in said chambers and slidably engaging said valve members, each of said springs lying wholly at one side of the center.

3. In a valve mechanism, a member providing concentric ported valve seats, annular valve members disposed on said seats, a guard member secured to said valve seat member, and a plurality of separate radially extending transversely flexed leaf springs slidably engaging said valve members and guard member, said springs being guided by said guard member, and each of said springs lying wholly at one side of the center.

4. In a valve mechanism, a member providing concentric ported valve seats, annular valve members disposed on said seats, a guard member secured to said valve seat member and having radially extending chambers formed therein, and a plurality of separate radially extending transversely flexed leaf springs loosely guided in said chambers and slidably engaging said valve members, said guard member providing guiding means for said springs, and each of said springs lying wholly at one side of the center.

5. In a valve mechanism, a member providing ported valve seats, separate valve members disposed on said seats, a guard member secured to said valve seat member, and a plurality of separate radially extending transversely flexed leaf springs loosely guided by said guard member, each spring having its opposite ends slidably engaging different valves.

6. In a valve mechanism, a member providing concentric valve seats and ports traversing said seats, separate annular valve members disposed on said seats, a guard member secured to said valve seat member, and a plurality of radially extending leaf springs each having a central bowed portion slidably engaging and loosely guided by said guard, and end portions slidably engaging said valve members, each of said springs lying wholly at one side of the center.

7. In a valve mechanism, a member providing concentric valve seats and ports traversing said seats, separate annular valve members disposed on said seats, a guard member secured to said valve seat member and having centrally located curved valve guiding portions, and depending valve guiding portions extending between said valve members, said guard member having chambers formed therein, and separate transversely flexed flat leaf springs loosely disposed in said chambers and guided by said guard member, each of said springs lying wholly at one side of a plane including the axis of the valve mechanism, said springs engaging said valves, said depending guiding portions also forming guiding means for said springs.

8. In a valve mechanism, a member providing concentric valve seats and ports traversing said seats, separate annular valve members disposed on said seats, a guard member secured to said valve seat member and having a centrally located curved valve guiding portion, and depending valve guiding portions extending between said valves, said guard member having radially extending chambers formed therein, and a plurality of transversely flexed flat leaf springs loosely guided in said chambers and slidably engaging said valves, each of said springs lying wholly at one side of the center, and said depending guiding portions also forming guiding means for said valves.

9. In a valve mechanism, a member providing concentric valve seats and ports traversing said seats, separate annular valve members disposed on said seats, radially extending springs engaging said valve members, each of said springs lying wholly at one side of the center and a guard member secured to said valve seat member and forming a stop for said valve members and springs and having guiding means therefor, said guard member having radially extending spring receiving chambers formed therein, the side walls of said chambers being cut away to provide flow openings.

10. In a valve mechanism, a member providing concentric valve seats and ports traversing said seats, annular valve members disposed on said seats, a guard member secured to said valve seat member, and radially extending transversely flexed flat leaf springs loosely guided by said guard, each of said springs lying wholly at one side of the center and each spring having a central bowed portion disposed in slidable contact with said guard, and end portions having sliding contact with said valve members.

11. In a valve mechanism, a member providing concentric valve seats and ports traversing said seats, annular valve members disposed on said seats, a guard member secured to said valve seat member, and radially extending transversely flexed flat leaf springs loosely guided by said guard, each of said springs lying wholly at one side of the center and each spring having a bowed central portion disposed in slidable linear contact with said guard, and end portions having sliding linear contact with said valve members.

12. In a valve mechanism, a member providing concentric valve seats and ports traversing said seats, annular valve members disposed on said seats, a guard member secured to said valve seat member and having depending valve guiding portions extending between said valves, and transversely flexed leaf springs engaging said guard member and valves, each of said springs lying wholly at one side of a plane including the axis of the valve mechanism, and said depending guiding portions also forming guides for said springs.

13. In a valve mechanism, a member providing concentric valve seats and ports traversing said seats, separate annular valve members of different diameters disposed on said seats, a guard member secured to said valve seat member forming a stop for said valves and having radially located spring receiving chambers formed therein, the side walls of said chambers and the upper surface of said guard member being cut away to provide flow openings, said guard member having centrally located curved valve guiding portions and depending valve guiding portions extending between said valve members, a plurality of separate transversely flexed flat leaf springs loosely guided in said chambers and having sliding contact with said valves, each of said springs lying wholly at one side of a plane including the axis of the valve mechanism, and said depending guiding portions on said guard member also forming guiding means for said springs.

14. In a valve mechanism, a member providing ported valve seats, separate valve members disposed on said seats, a guard member secured to said valve seat member, and a spring, bowed intermediate its ends, loosely guided by said guard member and slidably engaging with the one end one of said valve members and with the other end another of said valve members.

15. In a valve mechanism, a member providing ported valve seats, separate valve members disposed on said seats, a guard member secured to said valve seat member, and a transversely flexed leaf spring slidably engaging said guard member and guided thereby, said spring engaging with the one end one of said valve members and with the other end another of said valve members.

16. In a valve mechanism, a member providing slotted valve seats, separate valve members disposed on said seats, a guard member secured to said valve seat member and having an elongated chamber formed therein whose longer dimension extends transversely of said slots, and a transversely flexed leaf spring loosely guided in said chamber and slidably engaging with the one end one of said valve members and with the other end another of said valve members.

In testimony whereof I affix my signature.

CHARLES F. OSGOOD.